Aug. 11, 1964 W. J. WALLACE, JR 3,144,142
SELF-UNLOADING CARGO SHIP
Filed Oct. 1, 1962 6 Sheets-Sheet 1
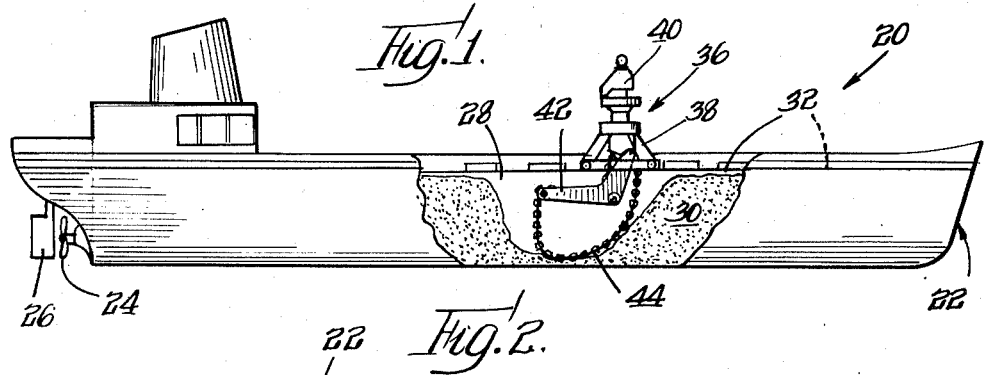
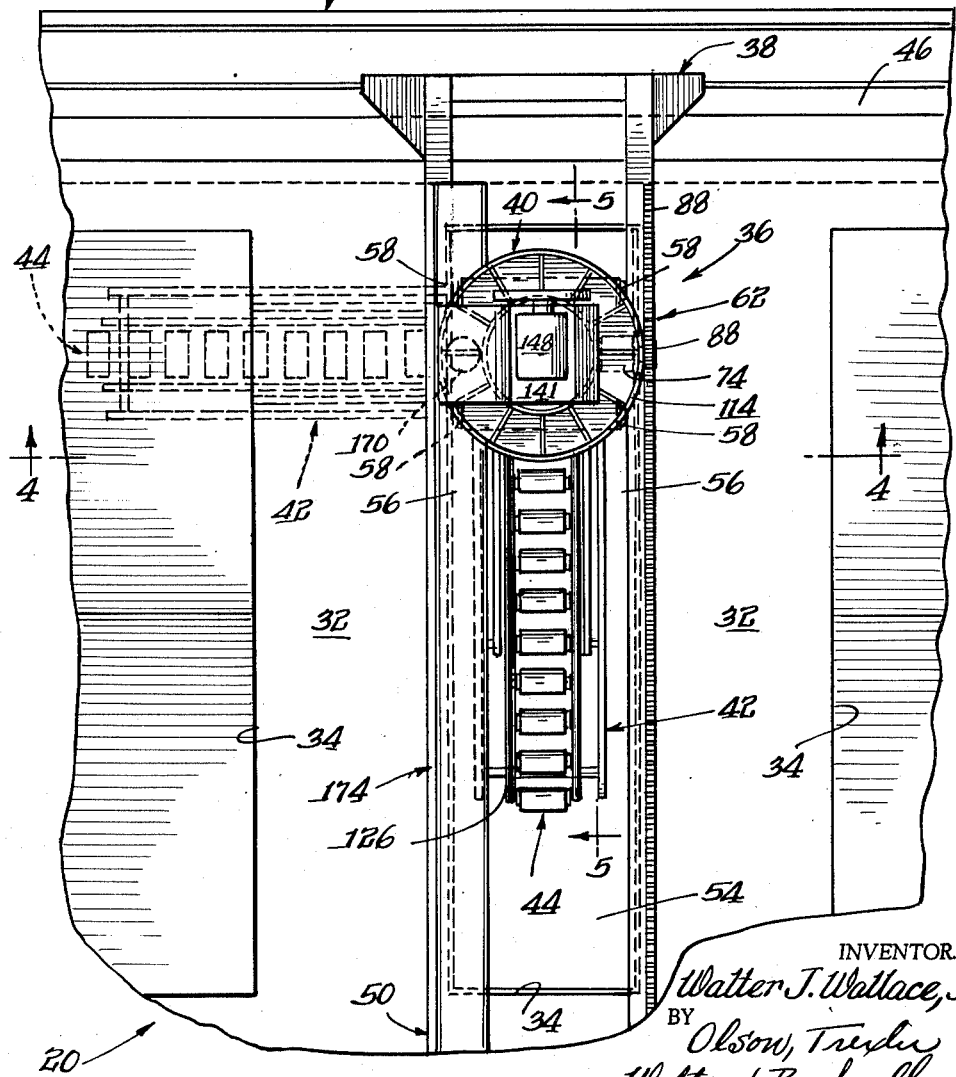
INVENTOR.
Walter J. Wallace, Jr.
BY Olson, Trexler
Wolters & Bushnell attys.

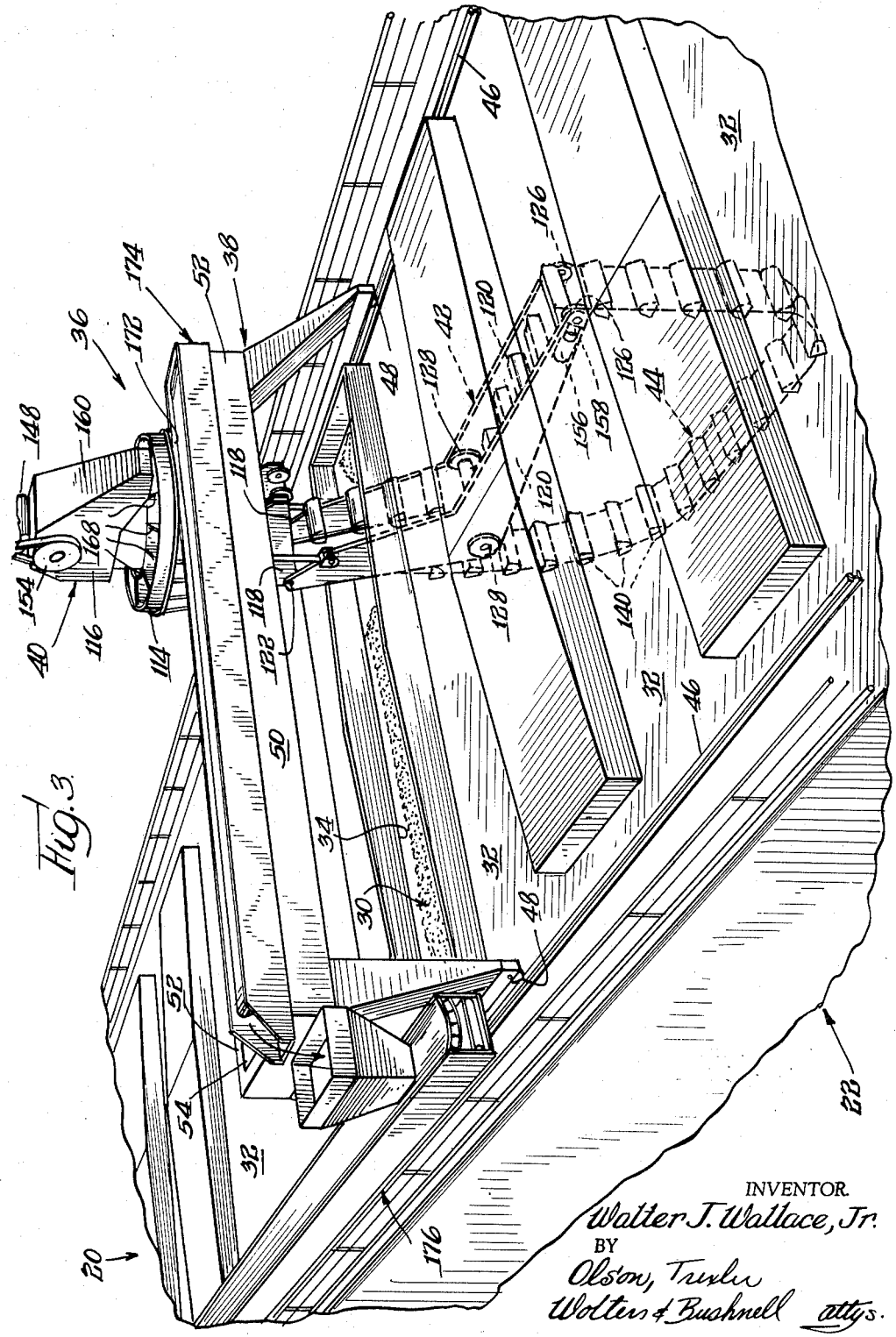

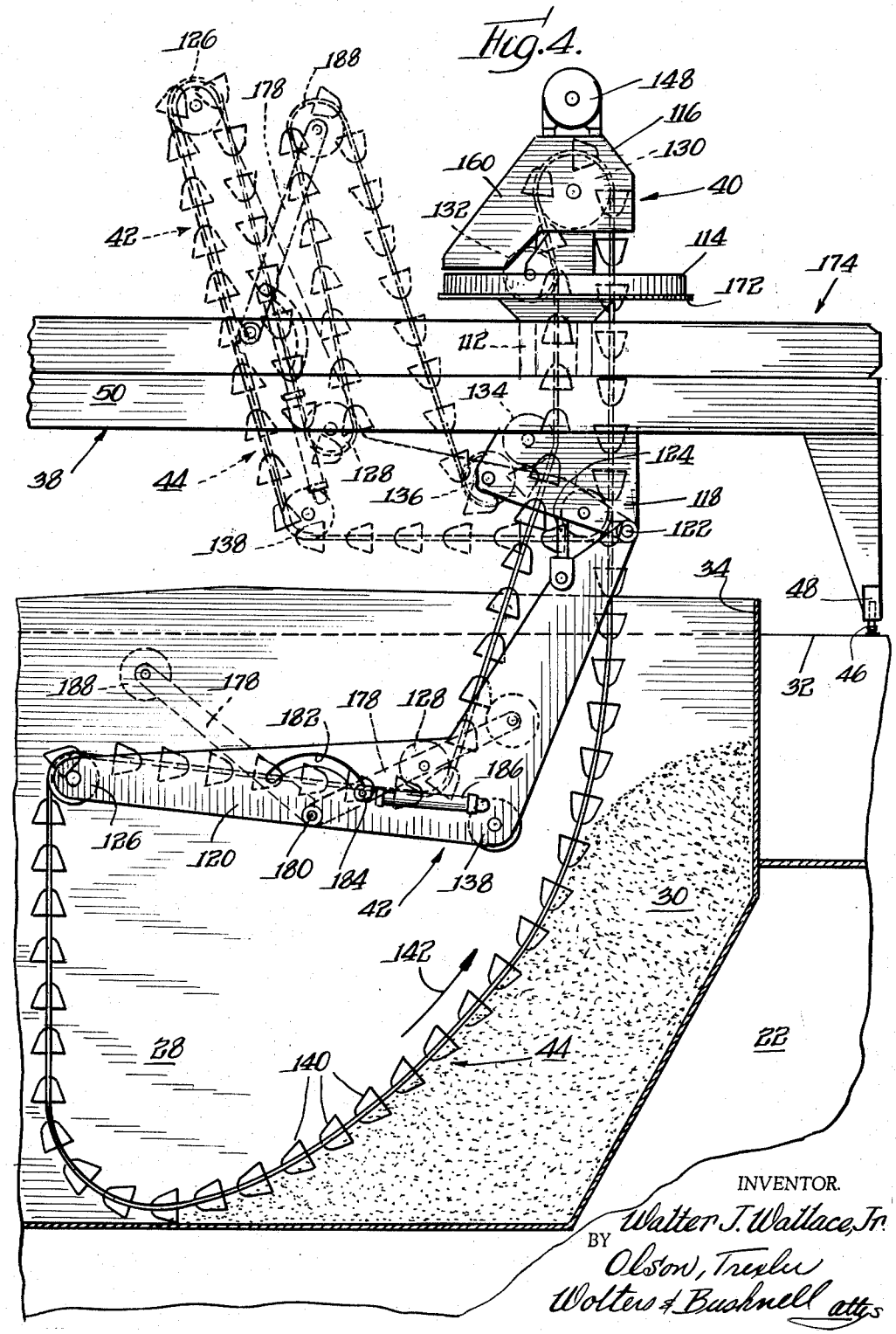

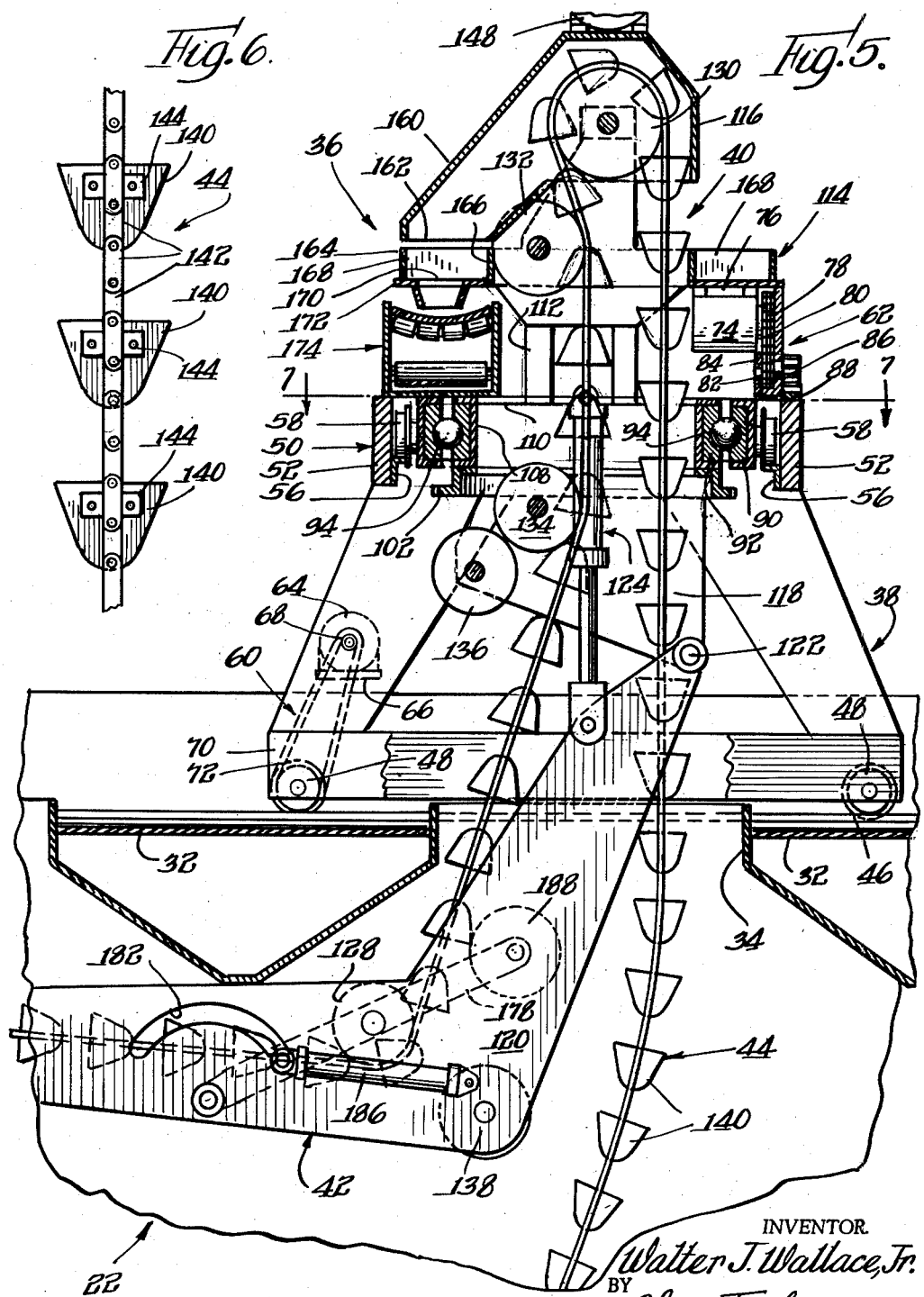

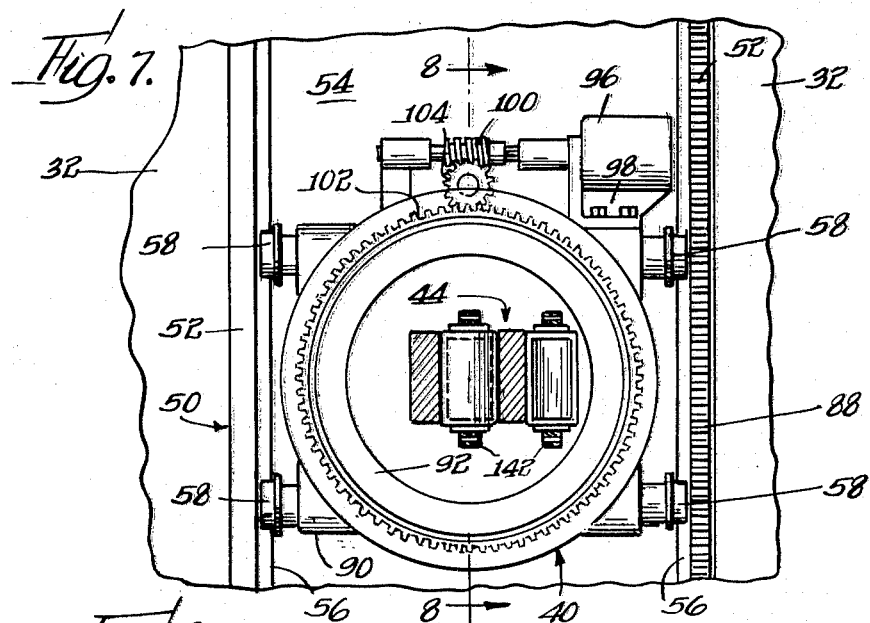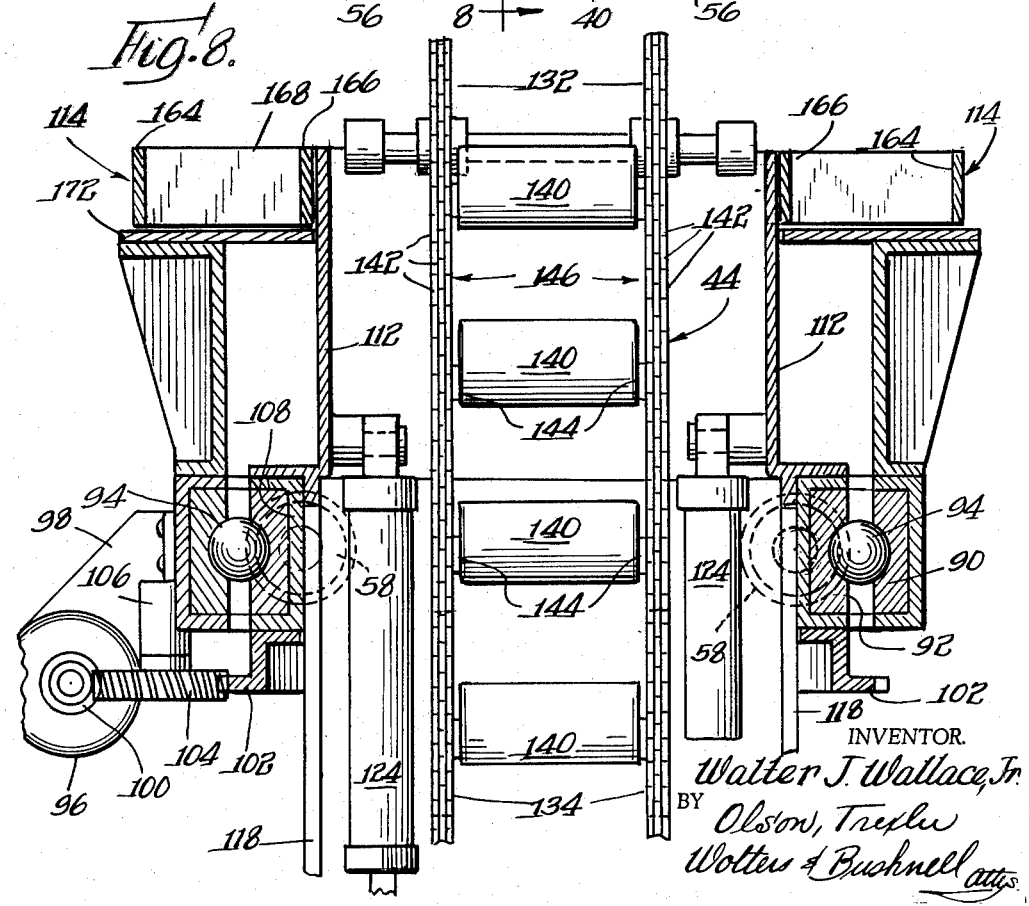

Aug. 11, 1964    W. J. WALLACE, JR    3,144,142
SELF-UNLOADING CARGO SHIP
Filed Oct. 1, 1962    6 Sheets-Sheet 6
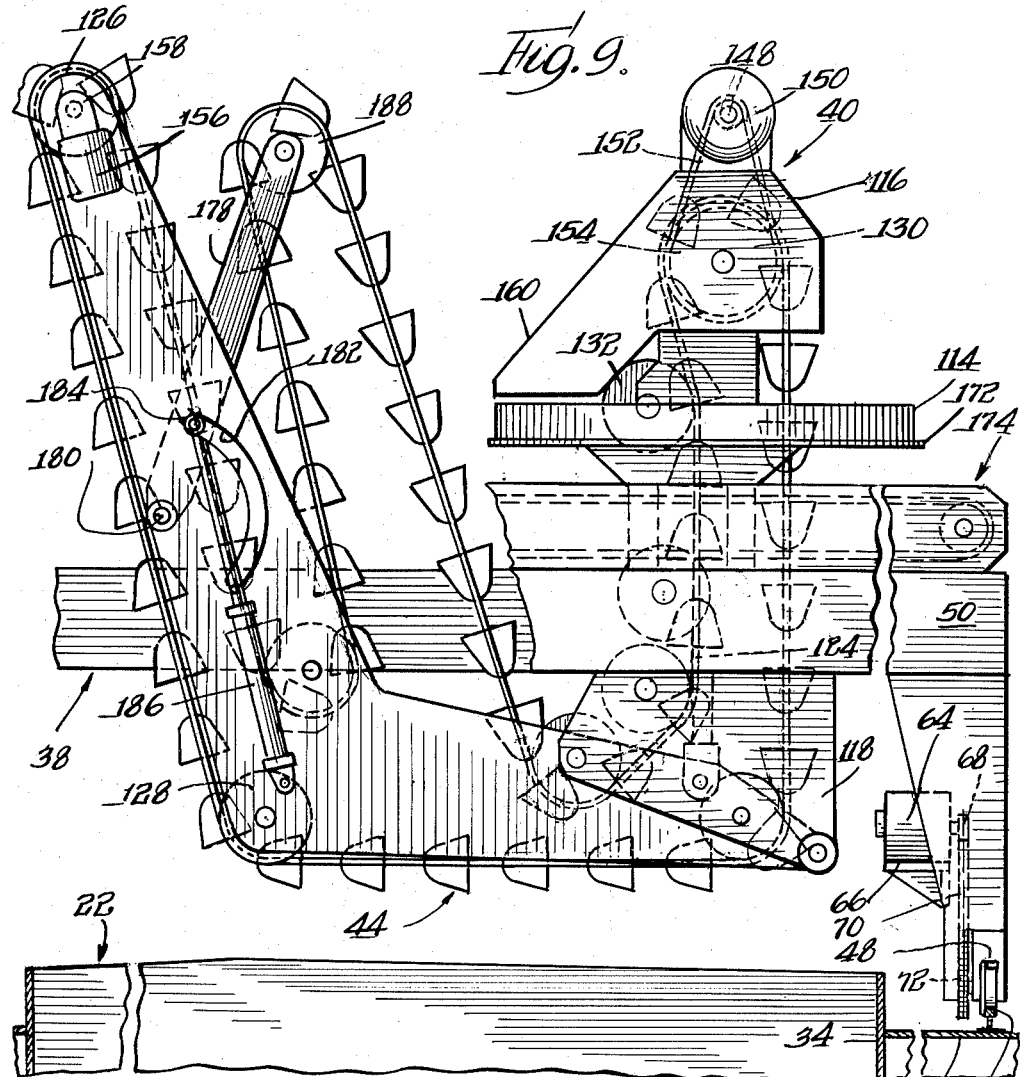
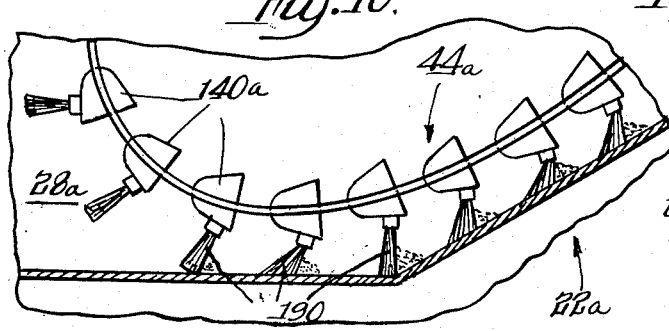
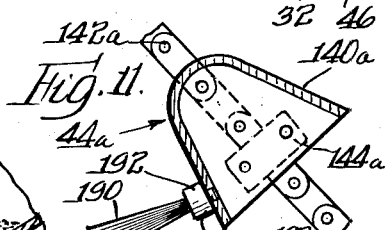
INVENTOR.
Walter J. Wallace, Jr.
BY Olson, Trexler
Wolters & Bushnell attys United States Patent Office 3,144,142
Patented Aug. 11, 1964

3,144,142
SELF-UNLOADING CARGO SHIP
Walter J. Wallace, Jr., Batavia, Ill., assignor to W. J. Wallace Systems, Inc., Batavia, Ill., a corporation of Delaware
Filed Oct. 1, 1962, Ser. No. 227,474
15 Claims. (Cl. 214—15)

This invention relates generally to cargo ships and more particularly to means for discharging particulate bulk cargo from a carrier vessel.

The builders of cargo ships are constantly confronted with a serious dilemma. From the standpoint of ease in unloading dry bulk cargo, such as iron ore, coal or grain, it would be preferable to have the entire decked area open or at least removable. From the standpoint of structural strength and resistance to torsional stresses applied by the sea, on the other hand, it would be preferable to have substantially the entire decked area closed with crossbeams, struts and framing. Since neither of these ideals is attainable as a practical matter, every bulk carrier afloat represents a compromise between hatch area and permanent decking.

The permanent decking which is thus a part of every cargo ship presents an imposing obstacle to fast economical unloading. Although that portion of the ship's hold which directly underlies the hatches is readily accessible for unloading by a crane-operated clamshell bucket or similar apparatus, the so-called wing area which underlies the permanent decking is not so accessible; and various practices are employed in delivering the bulk cargo from inaccessible wing areas to the accessible area under the square of the hatch. These practices range from manual shoveling to the use of small bulldozers. Accordingly, auxiliary unloading apparatus of some sort is required; and the principal and auxiliary unloading activities must be coordinated, usually to the detriment of fast efficient operation.

The problems involved in removing bulk cargo from under the wing areas also appertain to specially constructed "self-unloading" ships, ships arranged to preclude the need for aid from the shore in discharging a bulk cargo. One very popular type of self-unloading ship specifically incorporates a number of hoppers for containing the bulk cargo and for cooperating in its discharge from the ship. However, these hoppers may waste as much as 20% of the hold space of the ship and ordinarily add appreciably to the gross weight of the ship, reducing both its payload and carrying efficiency proportionately.

Therefore, an important object of the present invention is to provide a single, integrated machine for unloading bulk cargo from both the area under the square of the hatch and the wing areas.

Another object of the invention is to provide such a machine that is adapted for incorporation in a self-unloading cargo ship.

A more general object of the invention is to provide a new and improved self-unloading cargo ship.

A still more general object of the invention is to provide new and improved means for discharging a particulate bulk cargo from a carrier vessel.

A further object of the invention is to provide ship unloading apparatus that cleanly and completely discharges bulk cargo from a carrier vessel.

A still further object of the invention is to provide on-board unloading apparatus that efficiently utilizes the space and buoyant capabilities of the cooperating ship structure.

A yet further object of the invention is to provide ship unloading apparatus that is lightweight and inexpensive.

And a yet further object of the invention is to provide ship unloading apparatus that is characterized by its simple and efficient operation.

These and other objects and features of the invention will become more apparent from a reading of the following descriptions.

A cargo ship in accord with the invention comprises vessel means including a cargo-storing hold, a hatchway over a portion of the hold, and permanent decking over other portions of the hold radially outwardly from the hatchway; a crane mounted on the decking and including rail means adapted to project over the hatchway; a turret including a first turret member engaging the rail means to ride thereon, a second turret member rotatably supported by the first turret member, and a first guide on the second turret member defining an inflection point for a flexible conveyor; a deflected arm pivotally connected adjacent one end to the second turret member to be swingable in a vertical arc passing through the hatchway whereby to be raisable and lowerable relative to the hatchway, rotation of the second turret member swinging the deflected arm in a horizontal arc whereby to direct the other end of the arm beneath the permanent decking when the arm is in a lowered position; second and third guides on the deflected arm, disposed respectively adjacent the other end and adjacent the deflection point thereof; a flexible endless conveyor partly trained about the guides to follow a predetermined upper path defined by the guides and partly suspended from the guides to follow a freely flexing lower path adapted to intersect an underlying mass of particulate bulk cargo in the hold, the conveyor including a series of buckets opening in a common direction running generally from the second guide, through the lower path and toward the first guide; and drive means engaging the conveyor to circulate the conveyor in the aforementioned direction whereby the buckets collect quantities of the particulate bulk cargo upon traversing the lower path and whereby the buckets are inverted to dump the quantities of cargo upon traversing the inflection point.

The invention, both to its structure and mode of operation, will be better understood by reference to the following disclosure and drawings forming a part thereof, wherein:

FIG. 1 is a side elevational view of a self-unloading cargo ship constructed in compliance with the principles of the present invention;

FIG. 2 is an enlarged, fragmentary plan view of the cargo ship of FIG. 1, showing the ship unloading apparatus positioned over one of the hatchways provided in the deck of the ship, a rotated position of the deflected arm and conveyor of the unloading apparatus being shown in broken outline;

FIG. 3 is a perspective view of the ship unloading apparatus of FIG. 2;

FIG. 4 is a somewhat enlarged view taken substantially along the line 4—4 of FIG. 2 and illustrating the use position of the apparatus in solid outline and a retracted position for transport in broken outline;

FIG. 5 is an enlarged view taken substantially along the line 5—5 of FIG. 2;

FIG. 6 is an enlarged, side elevational view of the conveyor incorporated in the ship unloading apparatus of FIG. 2, showing in particular the relation between the buckets and chain link elements;

FIG. 7 is a plan view taken substantially along the line 7—7 of FIG. 5;

FIG. 8 is an enlarged, elevational view taken in cross-section substantially along the line 8—8 of FIG. 7;

FIG. 9 is an enlarged view of the upper portion of the ship unloading apparatus as it is illustrated in FIG. 4;

FIG. 10 is a side elevation view of a modified conveyor for use in the ship unloading apparatus of the invention; and FIG. 11 is an enlarged, elevational view of one of the buckets used in the modified conveyor of FIG. 10.

Referring now in detail to the drawings with primary initial reference to FIG. 1 and secondary reference to FIG. 2, a cargo ship indicated generally by the numeral 20 will be seen to comprise a floatable ship structure 22 powered through a screw or propeller 24 and dirigible by means of a rudder 26. The ship structure 22 includes a hold 28 which is adapted to receive and store a particulate bulk cargo 30, such as iron ore, coal or grain. It is recognized that the ship structure 22 may include a convenient number of holds suitably separated by means of bulkheads. The ship structure also includes permanent decking 32 over portions of the hold 28; and as is best shown in FIG. 2, the permanent decking 32 is perforated at intervals with hatchways 34 spaced longitudinally of ship structure 22 over other portions of the hold 28. It is recognized that each hold in the ship may be opened by as many as three of four of the hatchways 34 and that these hatchways may be suitably closed by means of hatch covers or removable decking as is desired.

In compliance with the invention, ship unloading apparatus indicated generally by the numeral 36 is embodied in the cargo ship 20; and the ship unloading apparatus 36 generally includes a bridge crane 38 that is adapted to be transported over the permanent decking 32, a turret 40 mounted on the bridge crane to ride thereon athwart the ship, a deflected leg or arm 42 pivotally connected to the turret 40, and an endless flexible bucket conveyor or carrier 44 guided by the turret 40 and the arm 42.

With refeernce to FIGS. 2, 3 and 5, the bridge crane 38 is seen mounted to be shuttled longitudinally of the ship structure 22 on a pair of deck rails 46 which are situated respectively adjacent the opposite lateral sides of the ship structure and which are secured to the permanent decking 32 for support by suitable rail clamps and locks. Track wheels 48 are journaled to the bottom frame members of the bridge crane to engage the rails 46 and to direct movement of the bridge crane. The crane 38 also includes a horizontally extending bridge 50 which spans the deck of the cargo ship 20. The bridge 50 comprises sideframe members 52 which are spaced apart to define an elongated, rectangular opening 54, opening 54 extending substantially along the entire length of the bridge 50 for purposes which become more apparent hereinafter.

Considering FIGS. 5 and 7 in particular, a pair of bridge rails 56 will be seen fastened to the inner margins of sideframe members 52 in confronting relationship and projecting over the hatchways 34. The turret 40 is rollably supported on the bridge rails 56 by means of track wheels 58, the turret 40 being thereby shiftable transversely of the cargo ship. It is recognized that the bridge rails 56 can be eliminated and the turret 40 arranged for transverse movement relative to the cargo ship as by being supported on a monorail.

Suitable drive means are provided respectively to transport the bridge crane over the permanent decking of the ship structure and to transport the turret along the bridge of the crane 38. As is shown in FIG. 5, the drive arrangement for the crane is indicated generally by the numeral 60 and the drive arrangement for the turret is indicated generally by the numeral 62. The crane drive arrangement 60 includes a motor 64, preferably hydraulically operated, motor 64 being mounted to the framework of the bridge crane by means of a bracket 66. A sprocket 68 is secured to the output shaft of motor 64, and an endless drive chain 70 extends from the sprocket 68 to a sprocket 72 that is coupled to one of the track wheels 48 upon which the bridge crane is rollably supported. Thus, the chain 70, the sprockets 68 and 72, and the frictional coupling between the driven track wheel 48 and the corresponding deck rail 46 combine to permit the drive arrangement 60 to act between the bridge crane and the ship structure reversibly to transport the crane over the permanent decking in a direction longitudinally of the ship structure.

The turret drive arrangement 62 includes a motor 74 which is preferably hydraulically operated and which is mounted to the structure of turret 40 by means of a bracket 76. A sprocket 78 is connected to the output shaft of motor 74, and an endless chain 80 engages the sprocket 78 drivingly to couple the motor 74 to a sprocket 82 that is journaled to a frame member 84, frame member 84 being rigidly connected to the turret 40, as by being fastened to the housing of the motor 74 and the mounting bracket 76. A pinion gear 86 is affixed coaxially to the sprocket 82 to be rotatable therewith, and the pinion gear 86 is adapted to mesh with a rack 88 that is mounted on one of the sideframe members 52 of the bridge 50. Thus, the drive arrangement 62 is capable of acting between the turret 40 and the bridge crane 38 to transport the turret along the bridge rails 56 transversely of the cargo ship.

Turning now to a consideration of FIGS. 5, 7 and 8 for a more detailed description of the turret 40, the turret will be seen to include an outer turret member 90, to which the track wheels 58 are mounted, and to include an inner turret member or ring 92, ring 92 being rotatably supported by the outer turret member 90. Specifically, a suitable number of ball bearings 94 engage inner and outer race elements defined respectively in the ring 92 and in the outer turret member 90, ball bearings 94 accepting both thrust and radial load. To rotate the ring 92 relative to the outer turret member 90, a hydraulic drive motor 96 is fastened to the turret member 90 by means including a bracket 98, as is best shown in FIG. 7. Power is transmitted from the motor 96 to the ring 92 by means of a worm 100 mounted on the output shaft of the motor, a ring gear 102 fashioned on a peripheral portion of the ring 92, and a worm gear 104 meshing with both the worm 100 and the ring gear 102. Gear 104 is journaled to a bracket 106 which is, in turn, connected to the outer turret member 90 as is best shown in FIG. 8. Thus, the inner turret member or ring 92 is arranged to be driven in a freely and reversely rotatable fashion through a full 360° circle of revolution.

The ring gear 102 merges into a collar 108 that forms one part of a turret frame. As is best shown in FIG. 5, this turret frame further includes an annular plate 110 which connects the collar 108 with upright members 112. An annular feeder 114 and a housing 116 are also mounted on the turret frame, the former rotatably and the latter rigidly. The turret frame additionally includes a pair of horizontally spaced depending plates 118 which are best understood by viewing FIGS. 3 and 5. The turret frame and its complementary structures are connected to the inner turret member or ring 92 at the collar 108 in order to be rotatable therewith.

As has been described hereinabove, the ship unloading apparatus 36 includes a deflected arm 42; and with reference to FIG. 3, the arm 42 will be seen to comprise a pair of laterally spaced, substantially L-shaped plates 120 which are swingably coupled in individual fashion to the depending plates 118 by means of pivots 122. This pivotal connection of the deflected arm 42 permits the arm to swing in a vertical arc; and turning to a consideration of FIGS. 5 and 8, a pair of hydraulic jacks 124 will be seen mounted between the upright members 112 and the L-shaped plates 120 in order to swing the arm in this vertical arc. When the arm 42 is aligned with the central opening 54 of the bridge crane, as is shown in solid outline in FIG. 2, the jacks 124 are capable thus of raising and lowering the deflected arm 42 relative to a hatchway 34 aligned beneath the bridge crane 38.

As will be recognized, the hydraulic jacks 134 and the hydraulic motors 64, 74 and 96 are actuated by means of suitable components and fluid circuitry in compliance with well-known practices.

According to an important feature of the invention, guide means are situated between the spaced plates 120 of the arm 42, and an additional guide means is included in the turret 40. Specifically, spaced sprocket wheels 126 are rotatably mounted adjacent the free ends of the L-shaped plates 120 in confronting relationship. Spaced sprocket wheels 128 are rotatably mounted to the plates 120 adjacent the deflections thereof, and spaced sprocket wheels 130 are rotatably mounted to the housing 116 pursuant to the stated objective. Thus, the sprocket wheels 126 and 130 define rotary carrier guides mounted in horizontally spaced relation, and sprocket wheels 128 define a third rotary carrier guide situated generally intermediate the first two carrier guides, these carrier guides defining a predetermined path or upper reach for the flexible endless conveyor 44 that comprises an essential element of the ship unloading apparatus 36. Advantageously, other guides, in the form of spaced sprocket wheels, are provided in the upper reach or path through which the conveyor 44 is circulated; and turning to FIG. 4, these auxiliary guides are seen to include spaced pairs of sprocket wheels indicated by the numerals 132, 134, 136 and 138. The sprocket wheels 132 are rotatably mounted to the turret frame; the sprocket wheels 134 and 136 are rotatably mounted to the depending plates 118; and the sprocket wheels 138 are rotatably mounted to the spaced L-shaped plates 120, specifically at the deflection thereof spaced generally beneath the sprocket wheels 128.

Continuing with reference to FIG. 4, the conveyor 44 will be seen fashioned to take such a length that it is only partly trained over the described sprocket wheels; and in compliance with the teachings of the present invention, the remaining part of the conveyor 44 is suspended from the extremely positioned sprocket wheels, i.e. the sprocket wheels 126 and 130, to follow a freely flexing lower path which is adapted to intersect the underlying mass 30 of particulate bulk cargo. As will be recognized, when then lower reach of the conveyor 44 is situated out of contact with the floor of the hold, the particulate bulk cargo, or some other similar solid obstacle, it will hang generally in a catenary.

In order to collect quantities of the particulate bulk cargo, the conveyor 44 is arranged to include a series of buckets 140 which are spaced apart along the run of the conveyor; and with reference for the moment to FIG. 3, each of the buckets 140 will be seen to comprise, with reference to a six-sided orthogonal frame of reference, a bottom and at least three sides adjoining the bottom and extending therefrom to form with the bottom a receptacle for receiving and suspending a quantity of the particulate bulk cargo. Returning to FIG. 4, the buckets 140 are seen to open in a common direction along the length of the conveyor 44, this direction running generally from the sprocket wheels 126, through the lower path of the conveyor and toward the sprocket wheels 130, as is indicated generally by the arrow 142.

In addition to the buckets 140, the conveyor 44 includes chain means comprised of a multiplicity of interconnected, articulated links 142 as is well shown in FIG. 6. It will also be noted with reference to FIG. 6, that the individual buckets 140 are rigidly mounted to respective links by means of brackets 144; and turning to FIG. 8, the chain means of the conveyor 44 will be seen to comprise a pair of spaced-apart parallel chains 146, each of which is composed of a number of the links 142 and between which buckets 140 are completely situated. Brackets 144 are fastened at the sides of each of the buckets 140 to mount the buckets between opposed links in the chains 146. It has been found that reverse articulation of the conveyor 44, as is required for example upon its passage over the sprocket wheels 128, is facilitated by placement of the chains outside the lateral edges of the buckets.

In order to circulate the conveyor 44 in the direction indicated in FIG. 4 by arrow 142, i.e. in the direction in which the buckets 140 open, a hydraulic drive motor 148 is mounted atop the housing 116 of turret 40; and as will be seen in FIG. 9, a sprocket wheel 150 is mounted on the output shaft of the drive motor 148, and an endless chain 152 meshes with the sprocket wheel 150 and with a sprocket wheel 154 that is rigidly connected in coaxial fashion with one of the sprocket wheels 130. Advantageously, the two sprocket wheels 130 are connected by a common shaft whereby motive force from the drive motor 148 is applied to both of the chains of the conveyor 44. Smooth and uniform circulation of the conveyor is thus insured.

It has been found desirable to keep the upper reach of the conveyor 44 relatively taut and free of slack. Therefore, auxiliary drive means are provided at the lower or free end of arm 42; and with reference to FIG. 3, this drive means will be seen to include an electric motor 156 that is coupled to the shaft of sprocket wheels 126 by means of a speed-reducing transmission 158.

When the buckets 140 of the conveyor 44 engage the mass of particulate bulk cargo upon circulation of the conveyor, the buckets collect quantities of the cargo material; and as has been mentioned hereinabove, the sprocket wheels 130 define an inflection point which serves to invert the buckets 140 for dumping the quantities of cargo material which they have collected. Referring therefore to FIG. 5, and with secondary reference to FIG. 3, the housing 116 which is secured to the frame of turret 40 will be seen to include a discharge chute 160 which is aligned with the path in which the cargo material is expelled from the buckets, i.e. tangentially with respect to the sprocket wheels 130 and inclined in a downward direction. The chute 160 is fashioned with a discharge opening 162 at its lower end, and this discharge opening is aligned over the feeder 114. The feeder 114 comprises radially spaced-apart, coaxial cylinders 164 and 166, segment-like bins being defined between the cylinders 164 and 166 by radially disposed plates 168. The plates 168 are connected to both the cylinders 164 and 166 in order to create a rigid unit.

The feeder 114 is rotatably mounted on the turret 40 to be suitably driven thereabout in order to deliver cargo material ejected by the buckets 140 to a discharge opening 170 fashioned in a plate 172 which is positioned beneath the feeder 114 spaced closely apart from the feeder. Whereas the feeder 114 is rotatably mounted to the turret 40, the plate 172 is rigidly connected to the bridge crane 38 in order to position the discharge opening 170 in alignment with a transversely disposed, belt conveyor unit 174, conveyor unit 174 being mounted on the bridge 50 of the crane 38 to deliver cargo material from the feeder 114 to a longitudinally disposed, belt conveyor unit 176 shown in FIG. 3. Conveyor unit 176, as will be realized, may be mounted directly on the ship structure 22 or may comprise a portion of a dockside, material transfer unit.

Because conveyor 44 is arranged to define an unguided lower reach generally underlying the deflected arm 42 and because convenience dictates that the arm 42 be pivoted to the turret 40 at a location disposed generally beneath the bridge 50 and spaced above the hatchways 34, means are provided, in compliance with a feature of the invention, to increase selectively the length of the guided upper reach and simultaneously to decrease the length of the free-hanging lower reach. This selective alteration in the respective lengths of the guided upper reach and the free-hanging lower reach, in effect, draws the portion of the conveyor 44 which is in the lower reach into substantially immobilized condition whereby to facilitate raising and lowering the deflected arm 42 through a hatchway 34, the arm 42 being swung in a vertical arc about the pivots 122 in accomplishing this raising and lowering. Contrariwise, selective lengthening of the lower conveyor reach, after it has been once drawn into the immobilized condition, serves to release the conveyor into operative engagement with a mass of the particulate bulk cargo. This latter capability is particularly advantageous when discharge of cargo from a completely filled hold is being initiated.

In the illustrated embodiment, the means for selectively lengthening and shortening the lower conveyor reach include, as is shown in FIGS. 4 and 9, a pair of laterally spaced arms 178 swingably mounted respectively to the L-shaped plates 120 therebetween by means of pivots 180. The pivots 180 are situated approximately midway between the sprocket wheels 126 and the sprocket wheels 138; and in order to control the swinging movements of the arms 178, arcuate cam slots 182 are fashioned in the plates 120 employing the pivots 180 as centers. A follower element 184 is secured to each of the arms 178 to operate in the corresponding cam slot 182. Selective movement of the arms 178 is achieved by means of a pair of hydraulic jacks 186 which are connected respectively between the follower elements 184 and the corresponding plate 120 at a position adjacent the sprocket wheels 138.

Sprocket wheels 188 are journaled to the free ends of arms 178 aggressively to engage the conveyor 44 in the upper reach thereof upon the hydraulic jacks 186 urging the arms 178 away from the sprocket wheels 138 and generally toward the sprocket wheels 126.

For purposes of affording a more complete understanding of the invention, it is advantageous now to provide a functional description of the mode in which the component parts thus far identified cooperate.

When the ship 20 has reached port with a load of cargo and when the ship has docked for purposes of unloading the cargo, the hatch cover will be removed from one of the hatchways 34; and the bridge crane 38 will be driven along the rails 46 until it is positioned spanning the open hatchway in the manner generally illustrated in FIG. 3. As will be recognized, the deflected arm 42 will have been raised into its uppermost condition by the action of hydraulic jacks 124 and the arms 178 will have been urged to increase the path length of the upper reach of conveyor 44 substantially to immobilize the conveyor for facility in transport of the bridge crane. This raised and immobilized position of the deflected arm and conveyor is generally shown in FIG. 9. It is also to be realized that the deflected arm and the conveyor will have been aligned longitudinally of the bridge crane in the opening 54 therein in order to permit this elevation of both the deflected arm and the immobilized conveyor. This relative position of the bridge crane and deflected arm is shown in solid outline in FIG. 2.

After the deflected arm and conveyor have been positioned over an open hatchway, the hydraulic jacks 186 will be directed to retract the arms 178 gradually to release the lower reach of the conveyor 44 into diggable relationship with the underlying particulate bulk cargo; and when the arms 178 have been completely retracted by the jacks 186 and it is desired to insure further engagement of the lower reach of the conveyor with the cargo material, the hydraulic jacks 124 will be actuated to lower the arm 42 gradually into the hold and through the selected hatchway 34. Eventually, the deflected arm and conveyor will take the position shown in solid outline in FIG. 4 where the conveyor is capable of reaching the bottom of the hold to remove substantially all of the particulate bulk cargo stored therein. It is important at this point to realize that the conveyor 44 can be released into diggable relationship with the bulk cargo by simultaneously retracting arms 178 and lowering arm 42 or by independently lowering arm 42, as well as by independently retracting the arms 178.

It is to be noted that the raising and lowering of conveyor 44 through the selected hatchway is achieved by a simple swinging action of the deflected arm 42. No vertical movements of the turret 40 or the connections between the turret and the deflected arm are thus required. As a consequence, permanent fixing of the space between the conveyor unit 174 and the discharge chute 160 is possible. Furthermore, the disclosed arrangement eliminates the need for expansive vertical guides and costly drive schemes having sufficient power to raise and lower a comparatively heavy conveyor system.

With reference to FIG. 4, it should be noted that, when the deflected arm 42 is disposed in its lowered position, the forward portion thereof from the sprocket wheels 138 to the sprocket wheels 126 is situated below the permanent decking 32 of the cargo ship. This spacing is achieved by the cumulative length of the members extending from the sprocket wheels 138 to the bridge crane 38. With the forward end of the deflected arm 42 thus disposed beneath the permanent decking 32, the arm 42 can be caused to move in a horizontal arc underneath the permanent decking for greater access to the particulate bulk cargo stored in the hold of the ship. Positioning of the forward end of the deflected arm 42 beneath the permanent decking is illustrated in broken outline in FIGS. 2 and 3. The freedom of movement thus afforded the deflected arm 42 and the conveyor 44 permits access to a rather sizable proportion of the particulate bulk cargo stored in the hold of the ship for ease in unloading the same. It will be realized that rotation of the turret 40 results in a corresponding swinging of the deflected arm and its conveyor in a horizontal arc; and in addition, transport of the turret 40 athwartships and along the bridge rails 56 results in a corresponding movement of the deflected arm and its conveyor. The ship unloading apparatus of the invention, hence, is readily capable of cleanly and completely discharging a mass of bulk cargo from a carrier vessel. Moreover, this capability is achieved without the need for heavy or bulky auxiliary equipment, it being important to realize that a bridge crane is customarily provided on a cargo ship for purposes of installing and removing hatch covers. Hence, the ship unloading apparatus of the invention efficiently utilizes the space and buoyant capabilities of the cooperating ship structure. From the foregoing descriptions, it should also be apparent that the ship unloading apparatus of the invention presents a single, integrated machine for unloading bulk cargo from both the area under the square of the hatch and under the wing areas.

While a particular embodiment of the invention has been thus far shown and described, it should be understood, of course, that the invention is not strictly limited thereto since many modifications may be made. For example, and with reference to FIGS. 10 and 11, a modified embodiment of the invention will be seen to incorporate means for cleaning the hold of the cargo ship after the cargo material has been substantially completely discharged. Since the embodiment of FIGS. 10 and 11 is similar in many regards to the embodiment of FIGS. 1-9, like numerals have been used to designate like parts, the suffix letter "a" being employed to distinguish those parts associated with the embodiment of FIGS. 10 and 11.

In the modified arrangement, a conveyor 44a is shown to include buckets 140a mounted on links 142a by means of brackets 144a in a manner similar to that described for the embodiment of FIGS. 1-9. The embodiment of FIGS. 10 and 11 is distinguished by the provision of broom elements 190 which are releasably attached, individually, to the underside of the buckets 140a by a coupling element 192. As is best shown in FIG. 10, the broom elements 190 are directed into sweeping engagement with the floor and inclined sidewalls of the hold 28a to clean the engaged surfaces.

The specific examples herein shown and described are to be considered as being primarily illustrative. Various changes in structure will, no doubt, occur to those skilled in the art; and these changes are to be understood as forming a part of this invention insofar as they fall within the spirit and scope of the appended claims.

The invention is claimed as follows:

1. A self-unloading cargo ship comprising: a ship structure including a cargo-storing hold, a hatchway over a portion of said hold, and permanent decking over other portions of said hold radially outwardly from said hatchway; crane means mounted on said decking, including rail means adapted to project over said hatchway; turret means including a first turret member engaging said rail means, a second turret member rotatably supported by said first turret member, and first guide means on said second turret member defining an inflection point for a flexible conveyor; a deflected arm pivotally connected adjacent one end to said second turret member to be swingable in a vertical arc passing through said hatchway whereby to be raisable and lowerable relative to said hatchway, rotation of said second turret member swinging said arm in a horizontal arc whereby to direct the other end of said arm beneath said permanent decking when said arm is in a lowered position; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a series of buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

2. A self-unloading cargo ship comprising: a ship structure including a cargo-storing hold, a plurality of hatchways spaced longitudinally of said ship structure over portions of said hold, and permanent decking over other portions of said hold intermediate and radially outwardly from said hatchways; crane means mounted on said decking to be transportable thereover, including rail means adapted to project over a said hatchway spaced thereabove; turret means including a first turret member engaging said rail means, a second turret member rotatably supported by said first turret member, and first guide means on said second turret member defining an inflection point for a flexible conveyor; a deflected arm pivotally conected adjacent on end to said second turret member to be swingable in a vertical arc passing through a said hatchway whereby to be raisable and lowerable relative to said hatchway, rotation of said second turret member swinging said arm in a horizontal arc whereby to direct the other end of said arm beneath said permanent decking when said arm is in a lowered position and whereby to transport said arm freely over said decking when said arm is in raised position; drive means acting between said crane means and said ship structure to transport said crane means over said decking in a direction longitudinally of said ship structure for relocating said arm between said hatchways; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a series of buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

3. A self-unloading cargo ship comprising: a ship structure including a cargo-storing hold, a hatchway over a portion of said hold, and permanent decking over other portions of said hold radially outwardly from said hatchway; crane means mounted on said decking, including rail means adapted to project over said hatchway; turret means including a first turret member engaging said rail means, a second turret member rotatably supported by said first turret member, and first guide means on said second turret member defining an inflection point for a flexible conveyor; a deflected arm pivotally connected adjacent one end to said second turret member to be swingable in a vertical arc passing through said hatchway whereby to be raisable and lowerable relative to said hatchway, rotation of said second turret member swinging said arm in a horizontal arc whereby to direct the other end of said arm beneath said permanent decking when said arm is in a lowered position; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a pair of spaced-apart parallel chains, each having a plurality of articulated links, said conveyor further including a series of buckets individually mounted between opposed links, said buckets opening in a common direction running generally from said second conveyor means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

4. A self-unloading cargo ship comprising: a ship structure including a cargo-storing hold, a hatchway over a portion of said hold, and permanent decking over other portions of said hold radially outwardly from said hatchway, crane means mounted on said decking, including rail means adapted to project over said hatchway; turret means including a first turret member engaging said rail means, a second turret member rotatably supported by said first turret member, and first guide means on said second turret member defining an inflection point for a flexible conveyor; a deflected arm pivotally connected adjacent one end to said second turret member to be swingable in a vertical arc passing through said hatchway whereby to be raisable and lowerable relative to said hatchway, rotation of said second turret member swinging said arm in a horizontal arc whereby to direct the other end of said arm beneath said permanent decking when said arm is in a lowered position; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a pair of endless, spaced-apart parallel chains, each having a plurality of articulated links, said conveyor further including a series of buckets individually mounted completely between opposed links substantially rigid with said opposed links, said buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of said cargo upon traversing said inflection point.

5. A self-unloading cargo ship comprising: a ship structure including a cargo-storing hold, a hatchway over a portion of said hold, and permanent decking over other portions of said hold radially outwardly from said hatchway; crane means mounted on said decking, including rail means adapted to project over said hatchway; turret means including a first turret member engaging said rail means to ride thereon, a second turret member rotatably supported by said first turret member, and first guide means on said second turret member defining an inflection point for a flexible conveyor; a deflected arm pivotally connected adjacent one end to said second turret member to be swingable in a vertical arc passing through said hatchway whereby to be raisable and lowerable relative to said hatchway, rotation of said second turret member swinging said arm in a horizontal arc whereby to direct the other end of said arm beneath said permanent decking when said arm is in a lowered position; second and third guide means on said arm and disposed respectively adjacent said other end and adjacent the deflection point thereof; drive means acting between said turret means and said crane means to transport said turret means along said rail means for shifting the position of said arm in said hold; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a series of buckets opening in a common direction running generally from said second guide means through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

6. A self-unloading cargo ship according to claim 1 and further comprising fourth guide means mounted on said arm and adapted to engage said conveyor in said upper path between two of said previously mentioned guide means; and selectively operable means acting to urge said fourth guide means into aggressive engagement with said conveyor for lengthening said upper path and shortening said lower path whereby to draw the portion of said conveyor in said lower path into substantially immobilized condition for ease in raising and lowering said deflected arm and said conveyor through said hatchway, said selectively operable means further acting to withdraw said fourth guide means out of aggressive engagement with said conveyor for shortening said upper path and lengthening said lower path whereby gradually to release said buckets into contact with said bulk cargo.

7. A self-unloading cargo ship according to claim 1 and further comprising fourth guide means mounted on said arm and adapted to engage said conveyor in said upper path between said first and said third guide means; and selectively operable means acting to urge said fourth guide means into aggressive engagement with said conveyor for lengthening said upper path and shortening said lower path whereby to draw the portion of said conveyor in said lower path into substantially immobilized condition for ease in raising and lowering said deflected arm and said conveyor through said hatchway, said selectively operable means further acting to withdraw said fourth guide means out of aggressive engagement with said conveyor for shortening said upper path and lengthening said lower path whereby gradually to release said buckets into contact with said bulk cargo.

8. A self-unloading cargo ship according to claim 1 and further comprising a broom element on at least some of said buckets at the underside thereof for sweepingly engaging the floor of said hold upon substantially complete discharge of said cargo.

9. A self-unloading cargo ship comprising: a ship structure including a cargo-storing hold, a hatchway over a portion of said hold, and permanent decking over other portions of said hold radially outwardly from said hatchway; crane means mounted on said decking, including rail means adapted to project over said hatchway; turret means including a first turret member engaging said rail means, a second turret member rotatably supported by said first turret member, and first guide means on said second turret member defining an inflection point for a flexible conveyor; a substantially L-shaped arm connected adjacent one end to said second turret member to depend therefrom, rotation of said second turret member swinging said arm in a horizontal arc whereby to direct the other end of said arm beneath said permanent decking; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo in said hold, said conveyor including a series of buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of said cargo upon traversing said inflection point.

10. A self-unloading cargo ship according to claim 9 and further comprising fourth guide means mounted on said arm and adapted to engage said conveyor in said upper path; and selectively operable means acting to urge said fourth guide means into aggressive engagement with said conveyor for lengthening said upper path and shortening said lower path whereby to draw the portion of said conveyor in said lower path into substantially immobilized condition for ease in raising and lowering said arm and said conveyor through said hatchway, said selectively operable means further acting to withdraw said fourth guide means out of aggressive engagement with said conveyor for shortening said upper path and lengthening said lower path whereby gradually to release said buckets into contact with said bulk cargo.

11. Apparatus according to claim 1 and further comprising a broom element on at least some of said buckets at the underside thereof for sweepingly engaging a floor underlying said flowable material upon substantially complete removal of said material.

12. Apparatus for discharging a particulate bulk cargo from a carrier vessel, said apparatus comprising: turret means including a first turret member, a second turret member rotatably supported by said first turret member, and first guide means on said second turret member defining an inflection point for a flexible conveyor; a deflected arm pivotally connected adjacent one end to said second turret member to be swingable in a vertical arc toward and away from a mass of a particulate bulk cargo, rotation of said second turret member swinging said arm in a horizontal arc whereby to direct the other end of said arm to sweep across said mass of bulk cargo; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo, said conveyor including a series of buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

13. Apparatus for discharging a particulate bulk cargo from a carrier vessel, said apparatus comprising: turret means including a first turret member, a second turret member rotatably supported by said first turret member, and first guide means on said second turret member defining an inflection point for a flexible conveyor; a deflected arm pivotally connected adjacent one end to said second turret member to be swingable in a vertical arc toward and away from a mass of particulate bulk cargo, rotation of said second turret member swinging said arm in a horizontal arc whereby to direct the other end of said arm to sweep across said mass of bulk cargo; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo, said conveyor including a pair of spaced-apart parallel chains, each having a plurality of articulated links, said conveyor further including a series of buckets individually mounted between opposed links, said buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

14. Apparatus for discharging a particulate bulk cargo from a carrier vessel, said apparatus comprising: turret means including a first turret member, a second turret member rotatably supported by said first turret member, and first guide means on said second turret member defining an inflection point for a flexible conveyor; a deflected arm pivotally connected adjacent one end to said second turret member to be swingable in a vertical arc toward and away from a mass of particulate bulk cargo, rotation of said second turret member swinging said arm in a horizontal arc whereby to direct the other end of said arm to sweep across said mass of bulk cargo; second and third guide means on said arm and disposed respectively adjacent said other end and adjacent the deflection point thereof; a flexible endless conveyor partly trained about said guide means to follow a predetermined upper path defined by said guide means and partly suspended from said guide means to follow a freely flexing lower path adapted to intersect an underlying mass of particulate bulk cargo, said conveyor including a pair of endless, spaced-apart parallel chains, each having a plurality of articulated links, said conveyor further including a series of buckets individually mounted completely between opposed links to be substantially rigid with said opposed links, said buckets opening in a common direction running generally from said second guide means, through said lower path and toward said first guide means; and drive means engaging said conveyor to circulate said conveyor in said direction whereby said buckets collect quantities of said particulate bulk cargo upon traversing said lower path and whereby said buckets are inverted to dump said quantities of cargo upon traversing said inflection point.

15. Apparatus according to claim 12 and further comprising fourth guide means mounted on said arm and adapted to engage said conveyor in said upper path between two of said previously mentioned guide means; and selectively operable means acting to urge said fourth guide means into aggressive engagement with said conveyor for lengthening said upper path and shortening said lower path whereby to draw the portion of said conveyor in said lower path into substantially immobilized condition for ease in raising and lowering said deflected arm and said conveyor through a hatchway, said selectively operable means further acting to withdraw said fourth guide means out of aggressive engagement with said conveyor for shortening said upper path and lengthening said lower path whereby gradually to release said buckets into said bulk cargo.

References Cited in the file of this patent

UNITED STATES PATENTS

| | | |
|---|---|---|
| 197,296 | Stokes | Nov. 20, 1877 |
| 775,686 | Smith | Nov. 22, 1904 |
| 1,332,426 | Cole | Mar. 2, 1920 |
| 2,941,668 | Maus | June 21, 1960 |

FOREIGN PATENTS

| | | |
|---|---|---|
| 279,147 | Italy | Oct. 31, 1930 |

UNITED STATES PATENT OFFICE
CERTIFICATE OF CORRECTION

Patent No. 3,144,142                        August 11, 1964

Walter J. Wallace, Jr.

It is hereby certified that error appears in the above numbered patent requiring correction and that the said Letters Patent should read as corrected below.

Column 3, line 31, for "refeernce" read -- reference --; line 45, after "which" insert -- will --; column 5, line 38, for "then" read -- the --; column 8, line 1, for "expansive" read -- expensive --; column 9, line 45, for "on" read -- one --.

Signed and sealed this 12th day of January 1965.

(SEAL)
Attest:

ERNEST W. SWIDER                        EDWARD J. BRENNER
Attesting Officer                         Commissioner of Patents